(12) United States Patent  (10) Patent No.: US 8,174,817 B2
Georgopoulos et al.  (45) Date of Patent: May 8, 2012

(54) SEALED AND IMPREGNATED WOUND CAPACITOR ASSEMBLIES

(75) Inventors: George Georgopoulos, Pine Brook, NJ (US); Stephan Andreas Hoffman, Gordonville, PA (US)

(73) Assignee: High Energy Corp., Parkesburg, PA (US)

( * ) Notice: Subject to any disclaimer, the term of this patent is extended or adjusted under 35 U.S.C. 154(b) by 175 days.

(21) Appl. No.: 12/816,819

(22) Filed: Jun. 16, 2010

(65) Prior Publication Data

US 2010/0315761 A1  Dec. 16, 2010

Related U.S. Application Data

(60) Provisional application No. 61/187,378, filed on Jun. 16, 2009.

(51) Int. Cl.
*H01G 4/04* (2006.01)

(52) U.S. Cl. ........ 361/327; 361/502; 361/301.5; 361/512; 361/523; 361/525

(58) Field of Classification Search ........ 361/327, 361/502, 503–504, 509–512, 516–519, 523–529, 361/279–280, 301.5
See application file for complete search history.

(56) References Cited

U.S. PATENT DOCUMENTS

| | | | |
|---|---|---|---|
| 4,771,363 A | 9/1988 | Kellerman | |
| 5,034,849 A * | 7/1991 | Vetter | 361/302 |
| 5,587,869 A | 12/1996 | Azumi et al. | |
| 6,246,568 B1 * | 6/2001 | Nakao et al. | 361/502 |
| 6,313,978 B1 | 11/2001 | Stockman et al. | |
| 6,493,206 B1 | 12/2002 | King | |
| 6,704,187 B2 * | 3/2004 | Schiveley et al. | 361/301.5 |
| 7,002,789 B1 | 2/2006 | Georgopoulos | |
| 7,394,648 B2 * | 7/2008 | Kondo et al. | 361/502 |
| 7,471,499 B2 * | 12/2008 | Bond | 361/274.1 |
| 7,881,043 B2 * | 2/2011 | Hirose et al. | 361/502 |
| 2006/0227495 A1 | 10/2006 | Stockman | |

* cited by examiner

*Primary Examiner* — Nguyen T Ha
(74) *Attorney, Agent, or Firm* — Philip O. Post

(57) ABSTRACT

At least one wound film/foil or metalized film capacitor is sealed between its electrodes to form a sealed enclosed annular region between the interior of the enclosure, the electrodes and the exterior of the wound capacitor to form a sealed capacitor assembly. A fluid dielectric can be introduced into the sealed enclosed annular region under a vacuum to form a sealed and impregnated wound capacitor assembly.

17 Claims, 13 Drawing Sheets

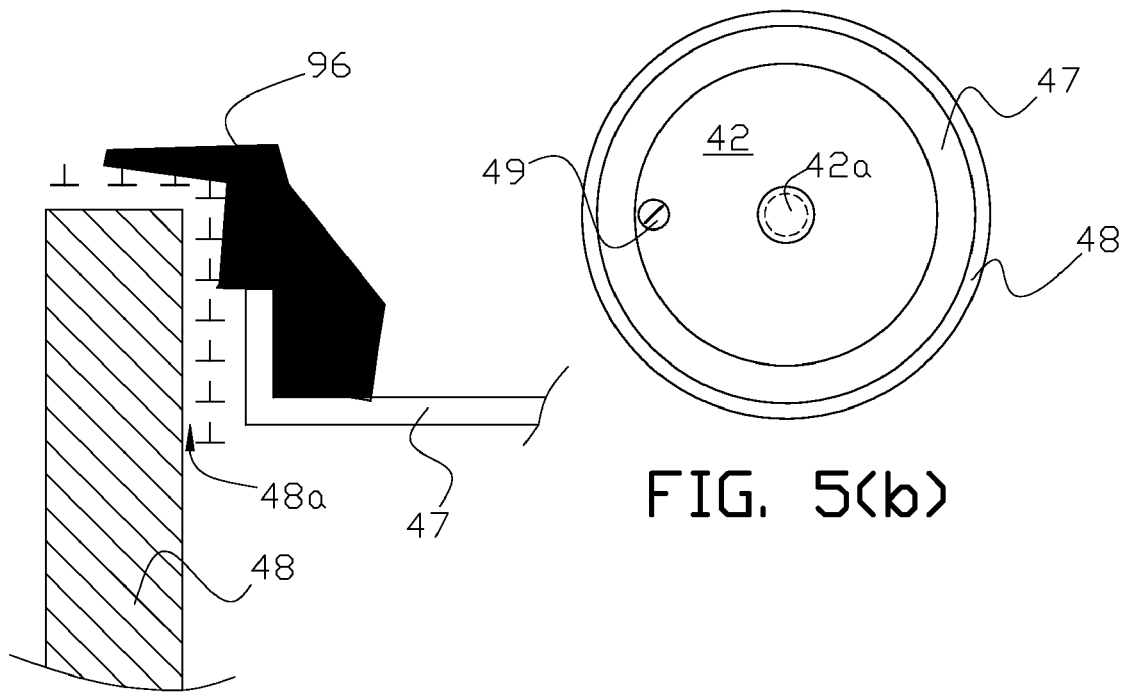
FIG. 5(b)
FIG. 5(c)
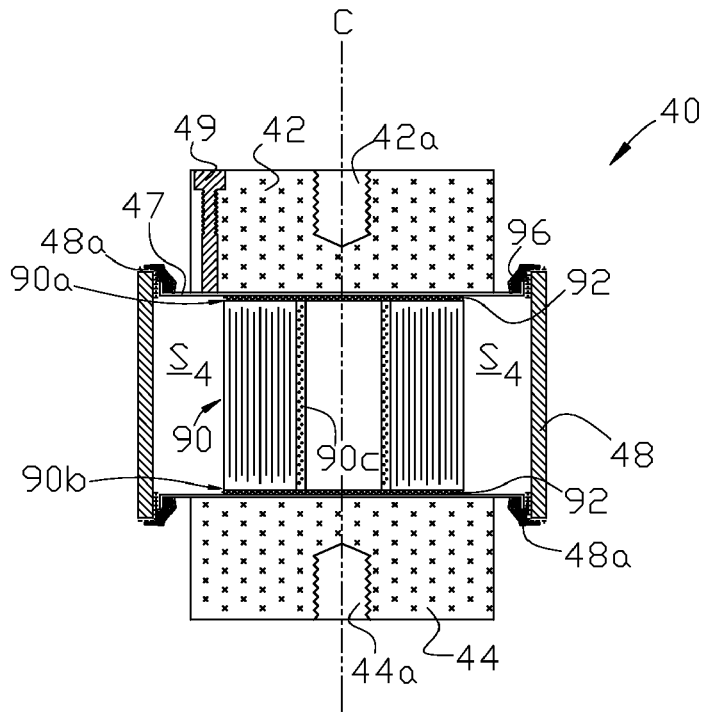
FIG. 5(a)

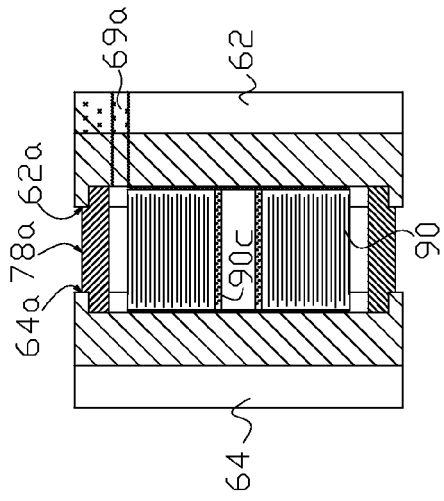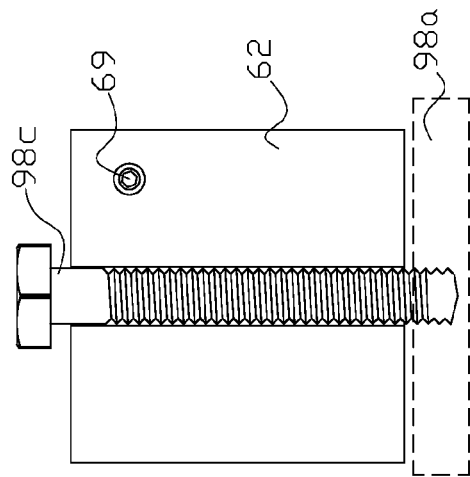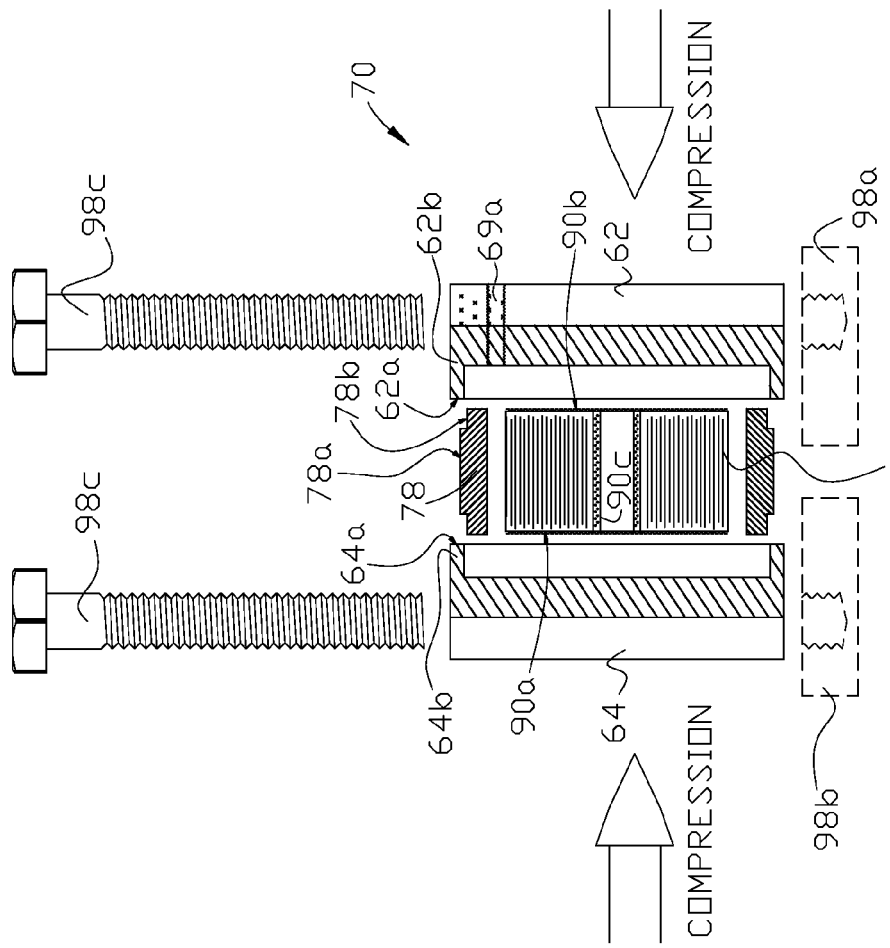

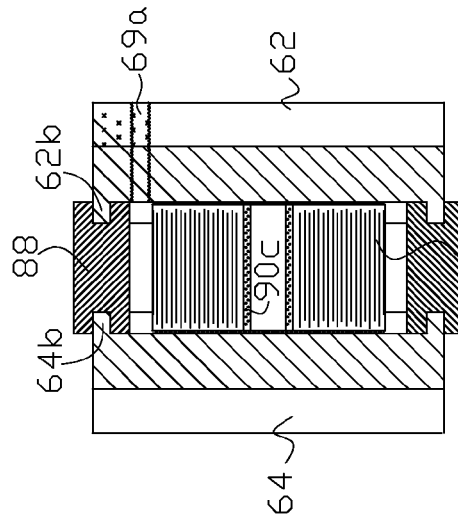
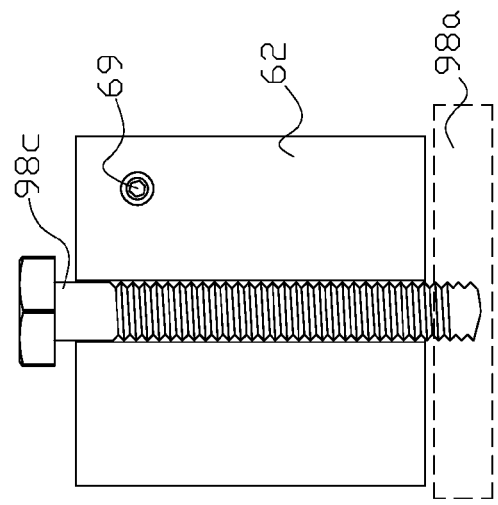
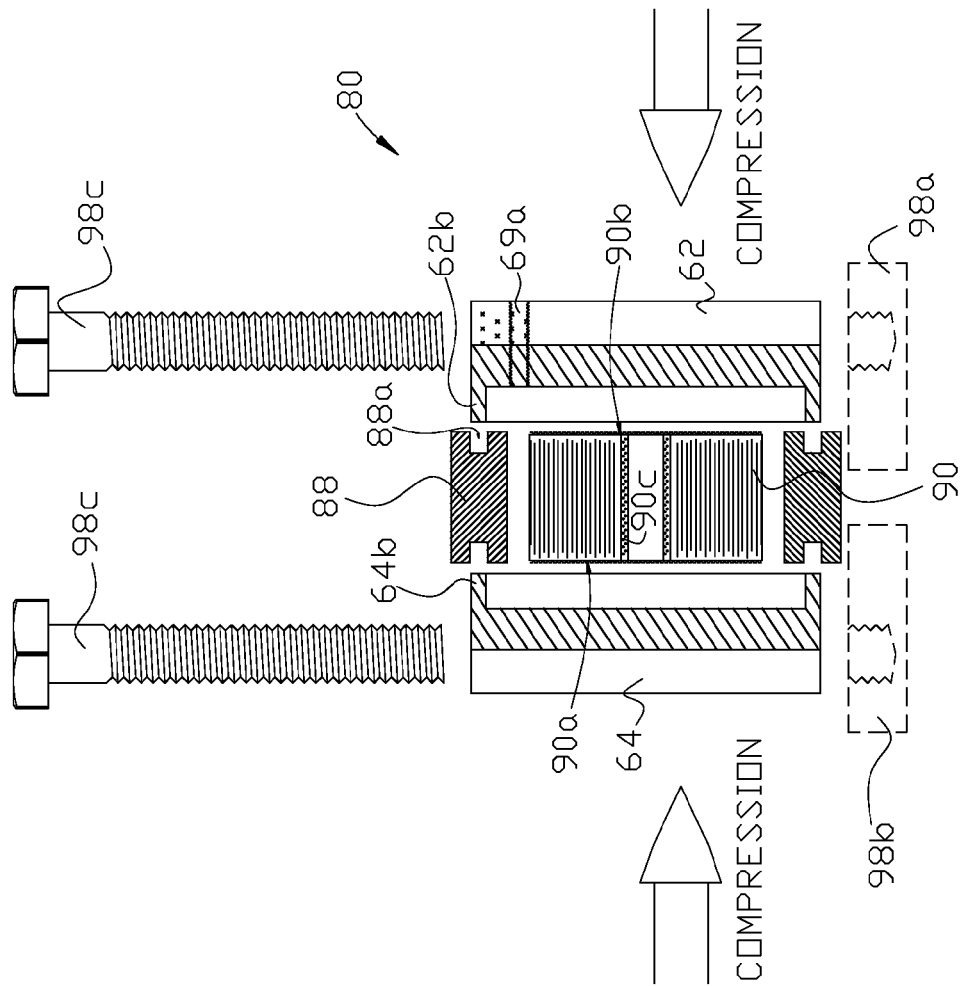

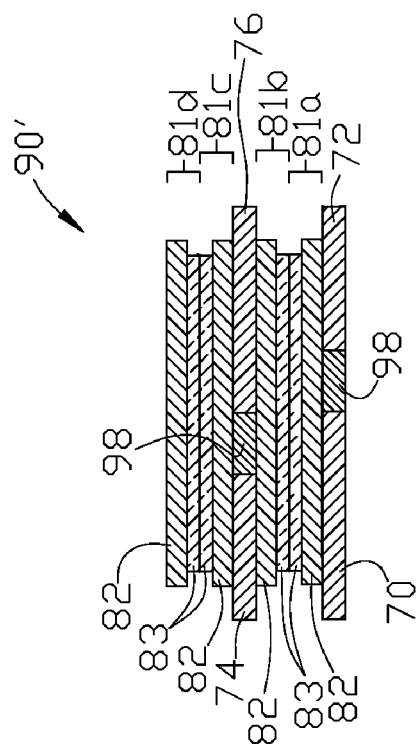
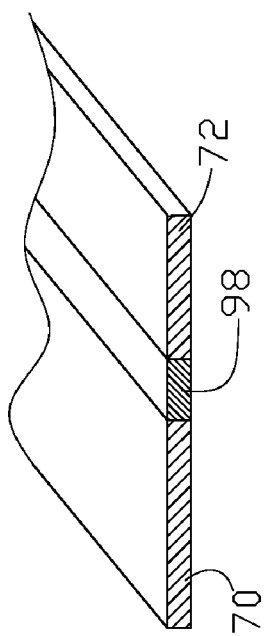
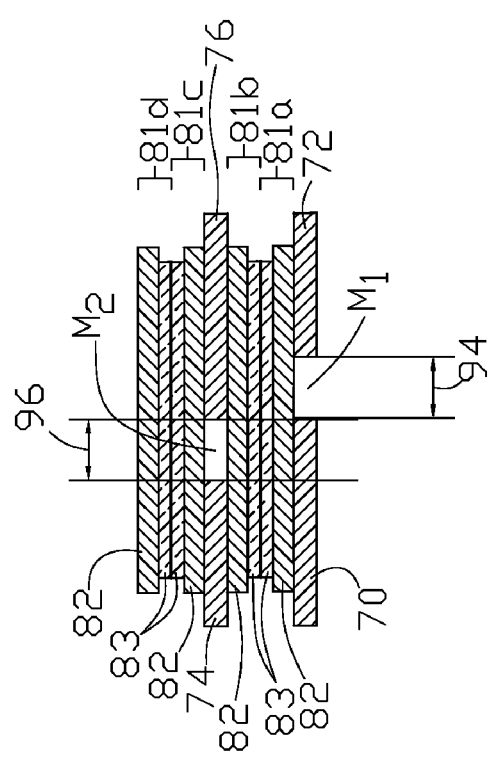
FIG. 14(b)
FIG. 14(c)
FIG. 14(a) PRIOR ART

SEALED AND IMPREGNATED WOUND CAPACITOR ASSEMBLIES

CROSS REFERENCE TO RELATED APPLICATIONS

This application claims the benefit of U.S. Provisional Application No. 61/187,378 filed Jun. 16, 2009, which is hereby incorporated by reference in its entirety.

FIELD OF THE INVENTION

The present invention relates to a sealed wound capacitor assembly where the wound capacitor is vacuum impregnated with a fluid dielectric drawn into an enclosure formed between the opposing electrodes of the wound capacitor assembly and the enclosure is an integral component of the capacitor assembly.

BACKGROUND OF THE INVENTION

U.S. Pat. No. 4,771,363 discloses hermetic sealing for film capacitors. A discrete film capacitor is disposed within a ceramic tube that is sealed at both ends by metal caps. The film capacitor is a conventional rolled film capacitor and is not subject to further processing when placed in the sealed container formed by the ceramic tube and end caps. Therefore there is the need for a sealable wound capacitor assembly with an integral enclosure that can be used to vacuum impregnate the wound capacitor.

It is one object of the present invention to provide a method of enclosing one or more wound capacitors between their electrodes and vacuum impregnating the enclosed one or more wound capacitors with a fluid dielectric.

It is another object of the present invention to provide a sealed and vacuum impregnated wound capacitor assembly wherein a sealed enclosed region is formed between the electrodes for each of the one or more wound capacitors used in the capacitor assembly so that the capacitor assembly is particularly suitable for high voltage and/or high current applications.

BRIEF SUMMARY OF THE INVENTION

At least one film/foil, metalized film, or mixed film/foil-metalized film wound capacitor is sealed between its electrodes to form a sealed enclosed region within which a fluid dielectric may be introduced under a vacuum to form a sealed vacuum impregnated wound capacitor assembly.

In one aspect the present invention is a sealed and impregnated wound capacitor assembly having first and second electrodes that are respectively connected to opposing ends of a wound capacitor to form an electrical connection between each end of the wound capacitor and the respective first and second electrodes. An enclosure surrounds the length of the wound capacitor. The enclosure forms a sealed annular region between the interior of the enclosure; the first and second electrodes; and the exterior of the length of the wound capacitor. A fill port is disposed within at least the first or second electrode to establish a fluid dielectric flow path into the sealed annular region. An insertable seal fitting can be fitted into the fill port to seal the fluid dielectric flow path, and a fluid dielectric is disposed between the conductor and insulation windings of the wound capacitor by vacuum impregnation of the fluid dielectric supplied to the sealed annular region via the fill port prior to sealing the fluid dielectric flow path with the insertable seal fitting.

In some examples of the invention the enclosure is a tubular enclosure that extends at opposing ends over a region of the first and second electrodes; a sealing element is disposed between each extended end of the tubular enclosure and the respective adjacent region of the first and second electrodes. In other examples of the invention the enclosure is a tubular enclosure and a region of the first and second electrodes extend over the outer adjacent ends of the tubular enclosure; a sealing element is disposed between each end of the tubular enclosure and the adjacent region of the first or second electrode. In other examples of the invention the enclosure is a tubular enclosure that extends at opposing ends over a peripheral region of the first and second electrodes; the interior of the extended ends of the tubular enclosure have a metalized or metal plated surface bonded to the peripheral regions of the first and second electrodes. In other examples of the invention a first and second electrical contact plate are respectively interposed between the first and second electrodes and the adjacent ends of the at least one wound capacitor; the first and second electrical contact plates are electrically connected to the respective first and second electrode and the adjacent ends of the at least one wound capacitor; the first and second electrical contact plates extend beyond the peripheral regions of the first and second electrodes, and the enclosure comprises a tubular enclosure extending at opposing ends over a peripheral region of the first and second electrical contact plates with the interiors of the extended ends of the tubular enclosure have a metalized, or metal plated, surface bonded to the peripheral regions of the first and second electrical contact plates. In other examples of the invention the enclosure is a tubular enclosure with each end of the tubular enclosure having a reduced outer diameter region; a recess is disposed in the outer wall of each of the reduced outer diameter regions, and a sealing element disposed in each of the recesses; a region of the first and second electrodes extend respectively over the reduced outer diameter region at the opposing ends of the tubular enclosure. In other examples of the invention the enclosure is a tubular enclosure formed from an elastomer with each end of the tubular enclosure having a reduced outer diameter region; a region of the first and second electrodes extend respectively over the reduced outer diameter region at the opposing ends of the tubular enclosure, and the regions of the first and second electrodes form a compression fit with the tubular enclosure. In other examples of the invention the enclosure is a tubular enclosure formed from an elastomer with each end of the tubular enclosure having a notched end; a region of the first and second electrodes is inserted into each of the notched ends of the tubular enclosure to form a compression fit with the tubular enclosure. In other examples of the invention the enclosure is a tubular enclosure formed from an elastomer with each end of the tubular enclosure having a reduced inner diameter region; a peripheral region of the first and second electrodes extend respectively into the reduced inner diameter regions at the opposing ends of the tubular enclosure, and the regions of the first and second electrodes form a compression fit with the tubular enclosure. In other examples of the invention the enclosure is a tubular enclosure formed from an elastomer with a peripheral edge region of the first and second electrodes compression fitted against edges of the tubular enclosure at opposing ends of the tubular enclosure.

In all examples of the invention, a recess may be provided in each of the first and second electrodes for attaching the capacitor assembly between electrical bus bars that may be vertically or horizontally oriented.

In another aspect the present invention is a method of forming a sealed and impregnated wound capacitor assembly.

First and second electrodes are connected to opposing ends of a wound capacitor to form an electrical connection between each end of the wound capacitor and the respective first and second electrodes. A pre-impregnated capacitor assembly is formed by surrounding the length of the wound capacitor with an enclosure forming a sealed annular region between the interior of the enclosure; the first and second electrodes; and the exterior of the length of each of the at least one capacitor. At least one fill port is provided in the first or second electrode to establish a fluid dielectric flow path into the sealed annular region. The pre-impregnated capacitor assembly is placed in a vacuum chamber that is evacuated, and the pre-impregnated capacitor assembly is submerged in a fluid dielectric. Subsequently the vacuum chamber is vented and the fill port is sealed with a seal fitting.

The above and other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 5(a) is a cross sectional elevation view; FIG. 5(b) is a top plan view; and FIG. 5(c) is a detail view of another example of a sealed and impregnated wound capacitor assembly of the present invention.

FIG. 9(a) is an exploded cross sectional elevation view, and FIG. 9(b) is a side elevational view of another example of a sealed and impregnated wound capacitor assembly of the present invention with reference to one example of mounting the capacitor assembly to external electrical conductors. FIG. 9(c) is an assembled cross sectional elevation view of the sealed and impregnated wound capacitor assembly shown in FIG. 9(a).

FIG. 10(a) is an exploded cross sectional elevation view, and FIG. 10(b) is a side elevational view of another example of a sealed and impregnated wound capacitor assembly of the present invention with reference to one example of mounting the capacitor assembly to external electrical conductors. FIG. 10(c) is an assembled cross sectional elevation view of the sealed and impregnated wound capacitor assembly shown in FIG. 10(a).

FIG. 14(a) is a cross sectional view of a typical wound capacitor utilizing an open-space margin between opposing electrodes in a single layer of the wound capacitor.

FIG. 14(b) is a cross sectional view of one example of a wound capacitor wherein an electrical insulating material is used to maintain the margin between opposing electrodes in a single layer of the wound capacitor.

FIG. 14(c) is an isometric view of a typical layer of a wound capacitor wherein the opposing electrodes in a single layer are separated by an electrical insulating material to maintain the margin between the electrodes in the single layer.

DETAILED DESCRIPTION OF THE INVENTION

Figure 1:
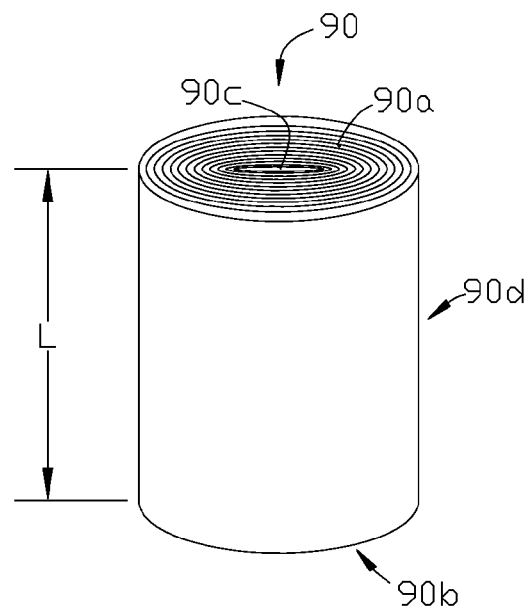
FIG. 1 is an isometric view of a typical wound capacitor utilized in the present invention.

Referring now to the drawings, wherein like numerals indicate like elements, there is shown in FIG. 1 one example of wound capacitor 90 that may be utilized in the various examples of the invention. Wound capacitor 90 may be a film/foil capacitor, a metalized film capacitor, or mixed film/foil-metalized film capacitor. Wound foil, or metalized film electrodes protrude from opposing axial ends 90a and 90b and are electrically connected to suitable opposing electrodes to form a wound capacitor having axial length, L.

Figure 2B:
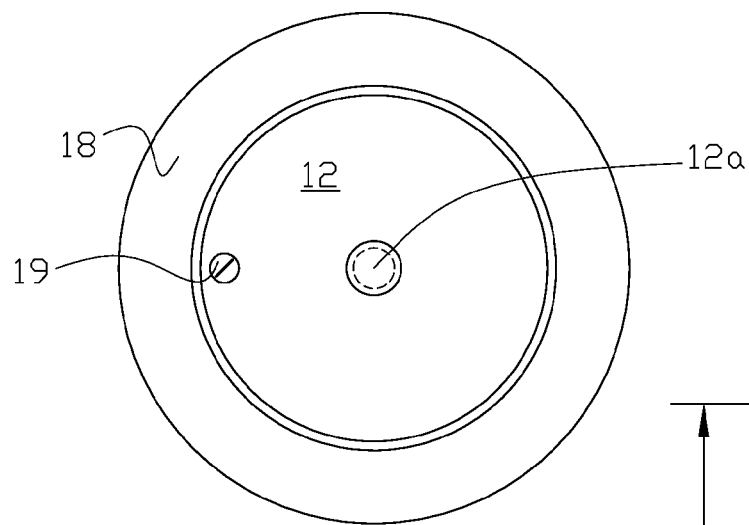
FIG. 2(b) is a top plan view of one example of a sealed and impregnated wound capacitor assembly of the present invention.
Figure 2A:
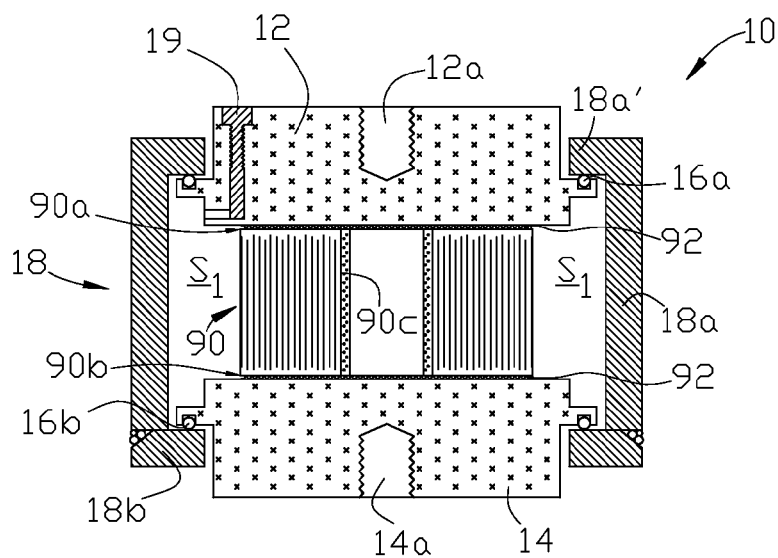
FIG. 2(a) is a cross sectional elevation view.

FIG. 2(a) and FIG. 2(b) illustrate one example of an assembled sealed and impregnated wound capacitor assembly 10 of the present invention. First and second electrodes 12 and 14 are formed from a suitable electrically conductive material, such as copper or brass. In all examples of the invention, each electrode may be formed from a solid block of material appropriately machined for features as identified in this specification. The wound foils or metalized films protruding from opposing ends 90a and 90b of wound capacitor 90 are electrically connected to the first and second electrodes, respectively, by a suitable method (for example, by suitable solder bond 92 or other bonding material), around the capacitor's inner core or spindle 90c. Suitable first and second sealing elements 16a and 16b form a substantially vacuum seal between the first and second electrodes and enclosure 18, which is formed at least partially from a non-electrically conductive material to prevent electrical shorting between the first and second electrodes. Each sealing element may be, for example, a suitable O-ring that is partially seated in a circular recessed region of each electrode. In this example enclosure 18 comprises cylindrical spacer or tube 18a having an inward facing ring 18a' (extend end) at a first end of the tube. At the opposing second end of the tube, ring 18b is suitably attached to the second end of the tube to form a second opposing extend end of the enclosure. Tube 18a and ring 18b may be formed from suitable plastic materials that are ultrasonically welded together. Enclosure 18 forms an enclosed annular region $S_1$ around the exterior cylindrical surface (length) 90d of wound capacitor 90 between the first and second electrodes except for one or more fill ports that form a through passage from the exterior of one, or both of the electrodes to the enclosed annular region. In FIG. 2(a) and FIG. 2(b) the single fill port is shown already sealed with seal fitting 19. The one or more open fill ports are used to vacuum fill the enclosed annular region with a fluid dielectric material as further described below, after which the one or more fill ports are sealed by a suitable means as shown, for example, in FIG. 2(a) and FIG. 2(b). Each electrode may be in the shape of a solid cylindrical form with a recess (either recess 12a or 14a) in each electrode to facilitate mounting of the capacitor assembly to bus bars, or other electrical conductors, that can be vertically oriented between capacitor assembly 10. In some examples of the invention a recessed region with protruding center post may be provided in each electrode so that the opposing interior ends of spindle 90c are seated over the center post of the electrodes while the opposing ends 90a and 90b are seated in the recessed region.

Figure 3B:
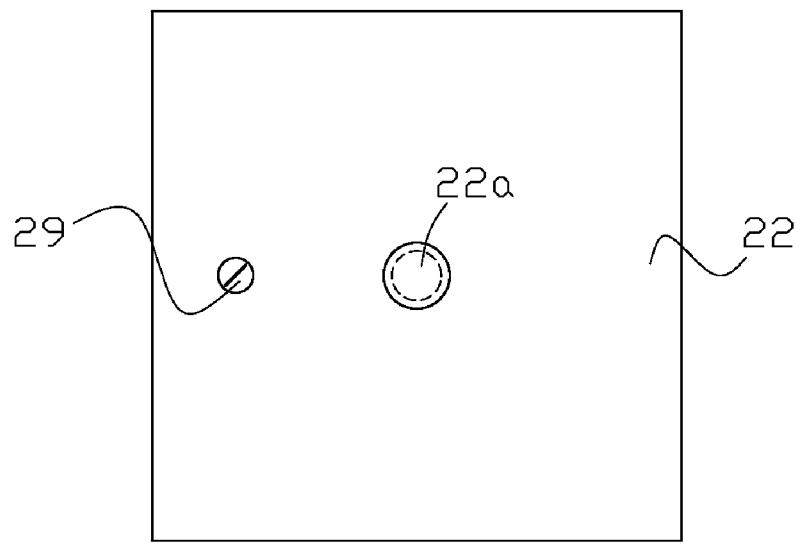
FIG. 3(b) is a top plan view of another example of a sealed and impregnated wound capacitor assembly of the present invention.
Figure 3A:
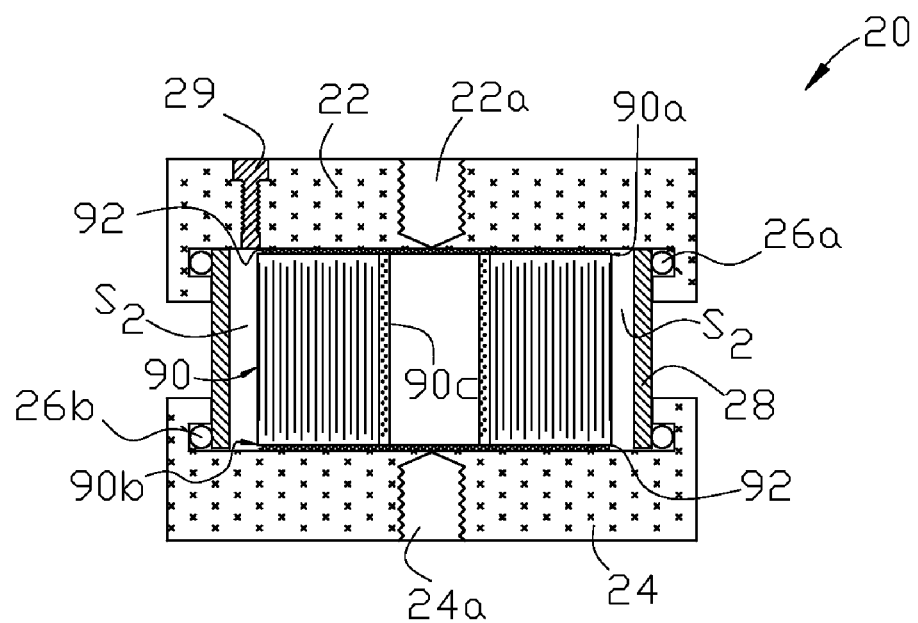
FIG. 3(a) is a cross sectional elevation view.

FIG. 3(a) and FIG. 3(b) illustrate another example of an assembled sealed and impregnated wound capacitor assembly 20 of the present invention. Capacitor assembly 20 is similar to the capacitor assembly shown in FIG. 2(a) and FIG. 2(b) except that enclosure 28 is formed within first and second electrodes 22 and 24, and may be in the shape of a cylindrical tube formed at least partially from an electrically insulating material as described in the previous example. The wound foils or metalized films protruding from opposing ends 90a and 90b of wound capacitor 90 are electrically connected to the first and second electrodes, respectively, by a suitable method (for example, by suitable solder bond 92 or other bonding material), around spindle 90c. Suitable first and second sealing elements 26a and 26b form a substantially vacuum seal between the first and second electrodes and enclosure 28. Each sealing element may be, for example, a suitable O-ring that is partially seated in a circular recessed region of each electrode. Enclosure 28 forms an enclosed annular region $S_2$ around the exterior cylindrical surface (length) 90d of wound capacitor 90 between the first and second electrodes except for one or more fill ports that form a through passage from the exterior of one, or both of the electrodes to the enclosed annular region. In FIG. 3(a) and FIG. 3(b) the single fill port is shown already sealed with seal fitting 29. Each electrode may be in the shape of a solid rectangular form with a recess (either recess 22a or 24a) in each electrode to facilitate mounting of the capacitor assembly to bus bars, or other electrical conductors, that can be vertically oriented between capacitor assembly 20. In some examples of the invention a recessed region with protruding center post may be provided in each electrode so that the opposing interior ends of spindle 90c are seated over the center post of the electrodes while the opposing ends 90a and 90b are seated in the recessed region.

Figure 4B:
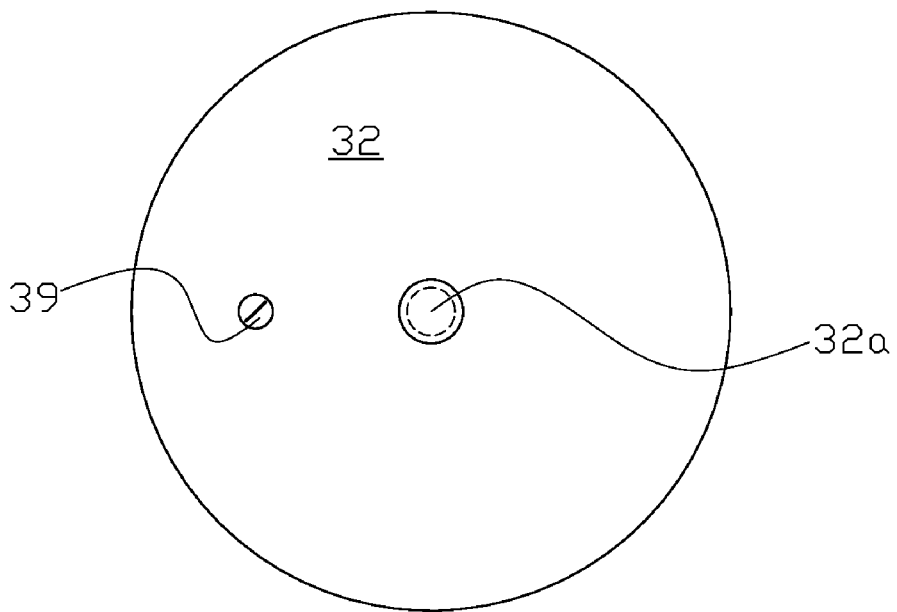
FIG. 4(b) is a top plan view of another example of a sealed and impregnated wound capacitor assembly of the present invention.
Figure 4A:
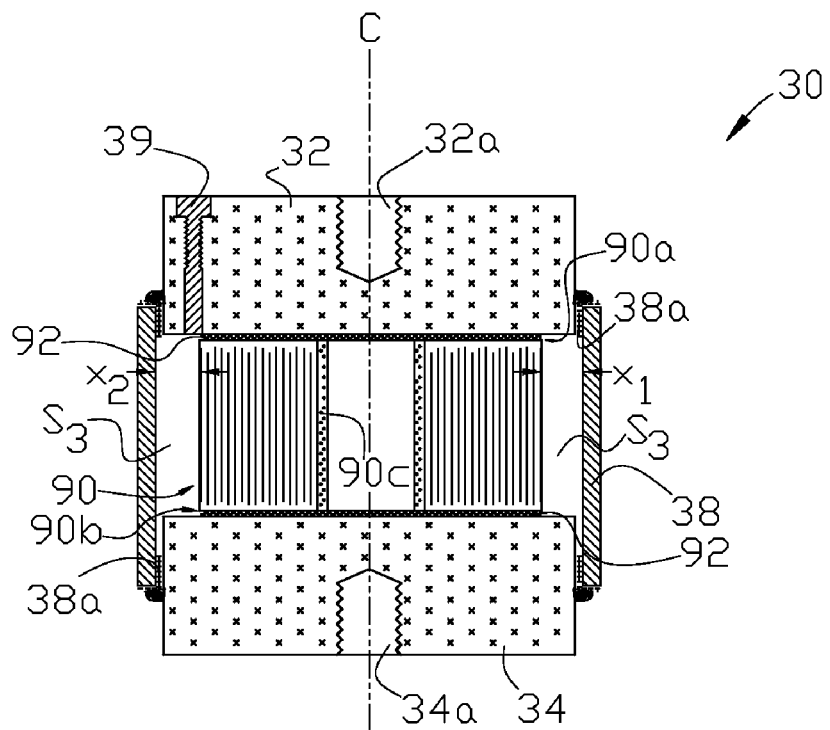
FIG. 4(a) is a cross sectional elevation view.

In another example of an assembled sealed and impregnated wound capacitor assembly 30 of the present invention, as shown in FIG. 4(a) and FIG. 4(b), enclosure 38 is formed around the peripheral outer regions of electrodes 32 and 34, and may be formed, for example, from a ceramic, porcelain or glass tube. Interior ends 38a of enclosure 38 can be metalized or metal plated to provide satisfactory bonding of the non-metallic enclosure to the outer sides of electrodes 32 and 34, for example by soldering. With this arrangement separate sealing elements are not required as in other examples of the invention. Also wound capacitor 90 may be asymmetrically positioned relative to the central axis, C, of enclosure 38 (so that distance $x_1$ is not equal to distance $x_2$) to allow a hermetic seal with no mechanical stress on the capacitor's winding connections. First and second electrodes 32 and 34 are formed from a suitable electrically conductive material. The wound foils or metalized films protruding from opposing ends 90a and 90b of wound capacitor 90 are electrically connected to the first and second electrodes, respectively, by a suitable method around spindle 90c. Enclosure 38 forms an enclosed annular region $S_3$ around the exterior cylindrical surface (length) 90d of wound capacitor 90 between the first and second electrodes except for one or more fill ports that form a through passage from the exterior of one, or both of the electrodes to the enclosed annular region. In FIG. 4(a) and FIG. 4(b) the single fill port is shown already sealed with seal fitting 39. Each electrode may be in the shape of a solid cylindrical form with a recess (either recess 32a or 34a) in each electrode to facilitate mounting of the capacitor assembly to bus bars, or other electrical conductors, that may be vertically oriented between capacitor assembly 30. In some examples of the invention a recessed region with protruding center post may be provided in each electrode so that the opposing interior ends of spindle 90c are seated over the center post of the electrodes while the opposing ends 90a and 90b are seated in the recessed region.

In another embodiment of an assembled sealed and impregnated wound capacitor assembly 40 of the present invention as shown in FIG. 5(a) and FIG. 5(b) enclosure 48 is similarly formed as enclosure 38 in the previous example except that it is joined to an extended (from the periphery of the electrodes) contact plate 47 so that the ends of enclosure 48 can be bonded to the contact plate as shown, for example, in detail FIG. 5(c), rather than directly to the electrodes. Enclosure 48 may be formed, for example, from a ceramic, porcelain or glass tube. Interior ends 48a of non-metallic enclosure 48 can be metalized, or metal plated, (represented by the "⊥" symbols in FIG. 5(c)) to provide satisfactory bonding of the non-metallic enclosure 48 to extended electrical contact plate 47, for example by solder 96 (represented by black region in FIG. 5(c)). With this arrangement, separate sealing elements are not required as in other examples of the invention. Also wound capacitor 90 may be asymmetrically positioned relative to the central axis, C, of enclosure 48 to allow a hermetic seal with no mechanical stress on the capacitor's winding connections. First and second electrodes 42 and 44 are formed from a suitable electrically conductive material. The wound foils or metalized films protruding from opposing ends 90a and 90b of wound capacitor 90 are electrically connected to extended contact plates 47 and the first and second electrodes, respectively, by a suitable method; that is, an electrical contact plate is electrically interposed between an electrode and the foils or metalized film protruding from an end of the wound capacitor. Enclosure 48 forms an enclosed annular region $S_4$ around the exterior cylindrical surface (length) 90d of wound capacitor 90 except for one or more fill ports that form a through passage from the exterior of one, or both of the electrodes to the enclosed annular region. In FIG. 5(a) and FIG. 5(b) the single fill port is shown already sealed with seal fitting 49. Each electrode may be in the shape of a solid cylindrical form with a recess (either recess 42a or 44a) in each electrode to facilitate mounting of the capacitor assembly to bus bars, or other electrical conductors, that can be vertically oriented between capacitor assembly 40. In some examples of the invention a recessed region with protruding center post may be provided in each electrode so that the opposing interior ends of spindle 90c are seated over the center post of the electrodes while the opposing ends 90a and 90b are seated in the recessed region.

Figure 6B:
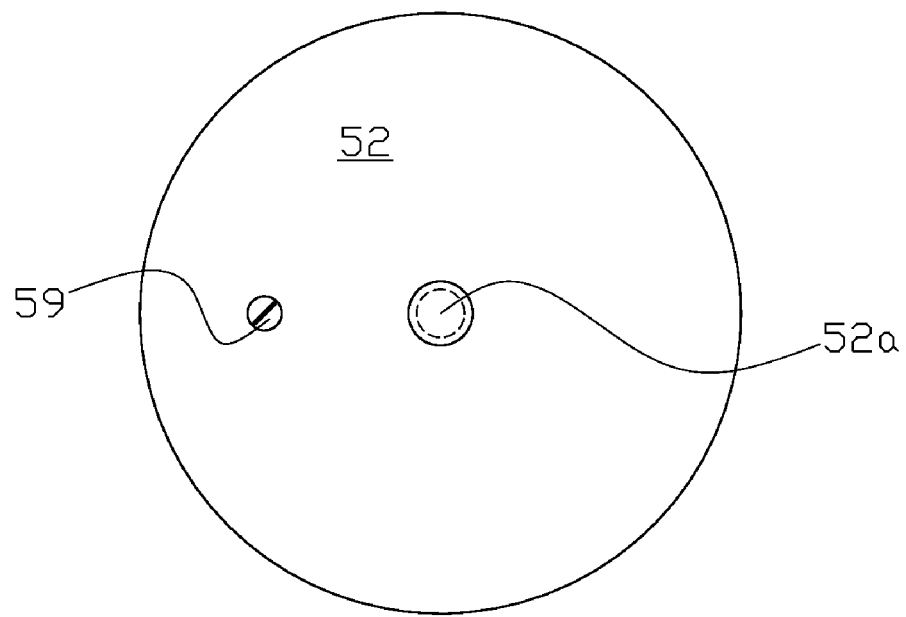
FIG. 6(b) is a top plan view of another example of a sealed and impregnated wound capacitor assembly of the present invention.
Figure 6A:
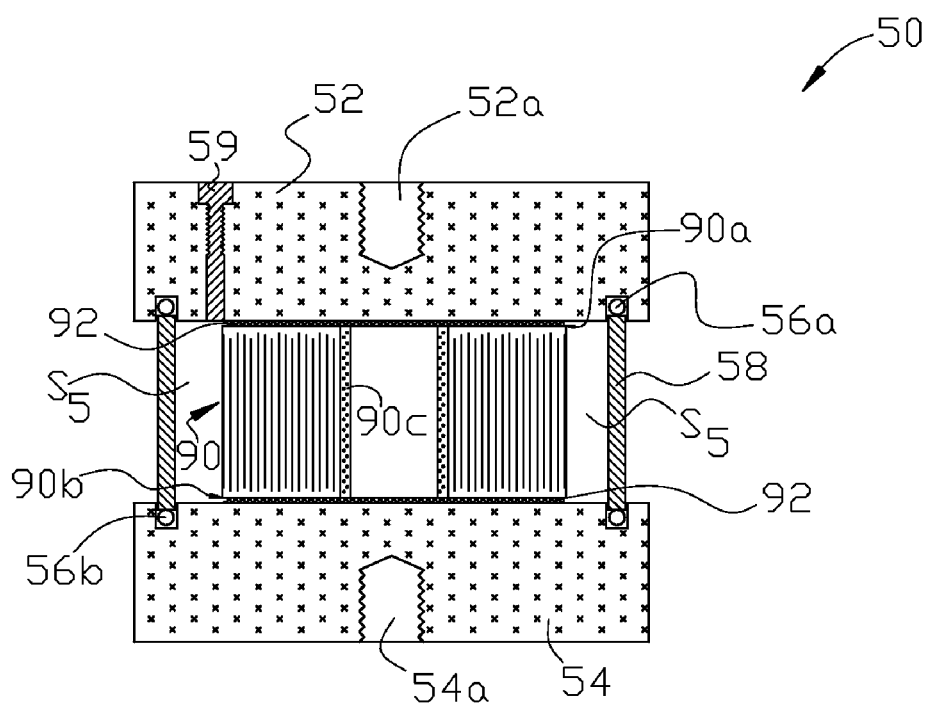
FIG. 6(a) is a cross sectional elevation view.

In another example of the present invention, the assembled sealed and wound capacitor assembly 50 in FIG. 6(a) and FIG. 6(b) is similar to that shown in FIG. 3(a) and FIG. 3(b) except that the electrodes are cylindrical in shape and sealing elements 56a and 56b are vertically oriented with respect to enclosure 58. First and second electrodes 52 and 54 are formed from a suitable electrically conductive material. The wound foils or metalized films protruding from opposing ends 90a and 90b of wound capacitor 90 are electrically connected to the first and second electrodes, respectively, by a suitable method (for example, by suitable solder bond 92 or other bonding material), around spindle 90c. Suitable first and second sealing elements 56a and 56b form a substantially vacuum seal between the first and second electrodes and enclosure 58. Each sealing element may be, for example, a suitable O-ring that is seated in a circular recessed region of each electrode. Enclosure 58 forms an enclosed annular region $S_5$ around the exterior cylindrical surface (length) 90d of wound capacitor 90 except for one or more fill ports that form a through passage from the exterior of one, or both of the electrodes to the enclosed annular region. In FIG. 6(a) and FIG. 6(b) the single fill port is shown already sealed with seal fitting 59. Each electrode may be in the shape of a solid cylindrical form with a recess (either recess 52a or 54a) in each electrode to facilitate mounting of the capacitor assembly to bus bars, or other electrical conductors, that can be vertically oriented between capacitor assembly 50. In some examples of the invention a recessed region with protruding center post may be provided in each electrode so that the opposing interior ends of spindle 90c are seated over the center post of the electrodes while the opposing ends 90a and 90b are seated in the recessed region.

Figure 7:
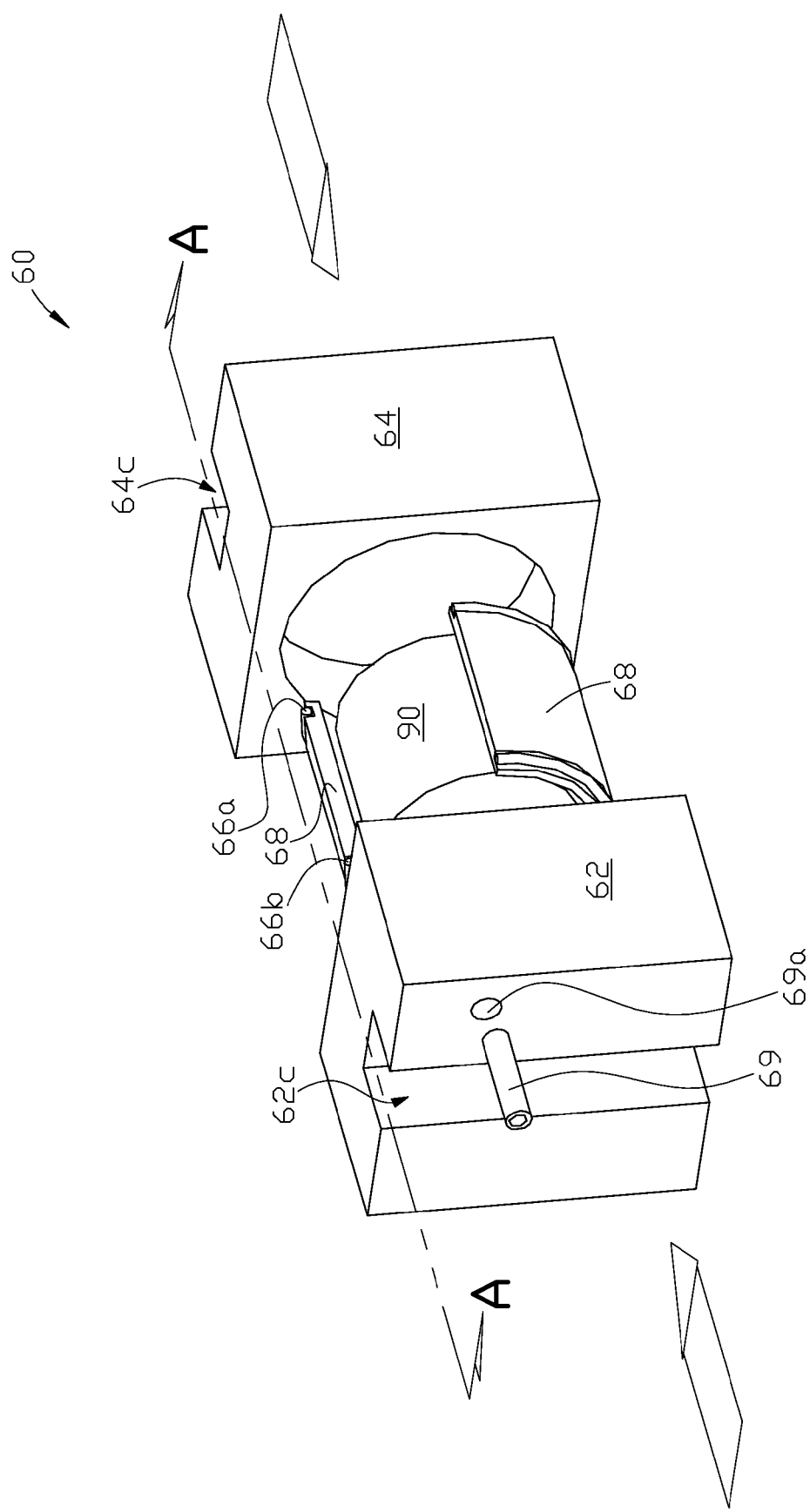
FIG. 7 is an exploded isometric view of another example of a sealed and impregnated wound capacitor assembly of the present invention.
Figure 8C:
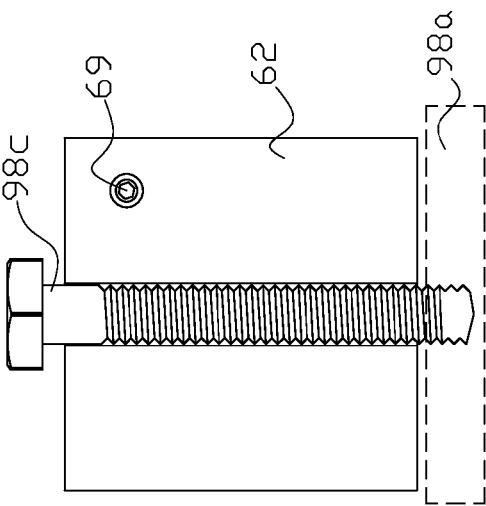
FIG. 8(c) is an assembled cross sectional elevation view of the sealed and impregnated wound capacitor assembly shown in FIG. 8(a).
Figure 8B:
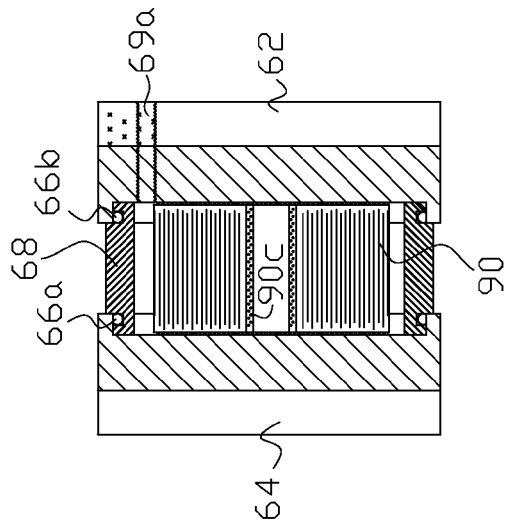
FIG. 8(b) is a side elevational view of the capacitor assembly shown in FIG. 7 with reference to one example of mounting the capacitor assembly to external electrical conductors.
Figure 8A:
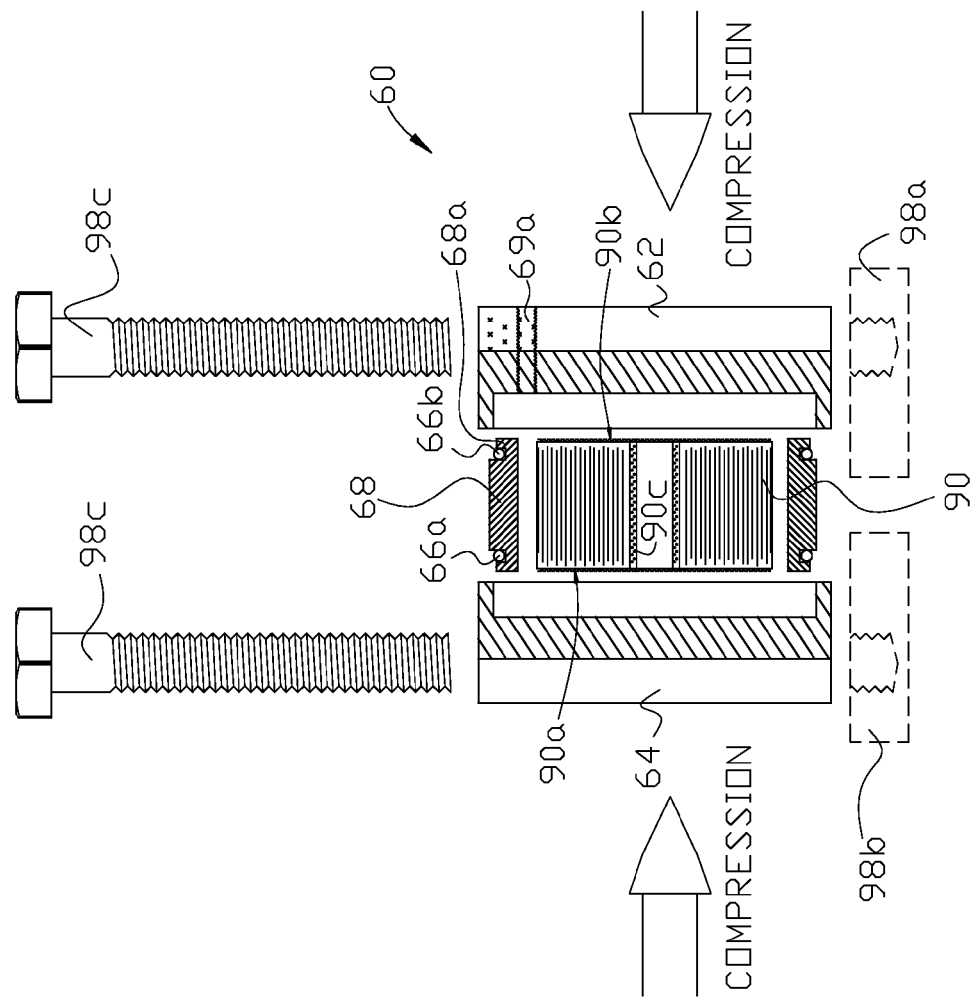
FIG. 8(a) is a cross sectional elevation view through line A-A in FIG. 7.

FIG. 7, FIG. 8(a) and FIG. 8(b) illustrate another example of a wound capacitor assembly of the present invention wherein disassembled wound capacitor assembly 60 is shown in FIG. 8(a) and FIG. 8(b) with orientation for mounting the capacitor assembly to horizontally oriented electrical conductors, such as bus bars 98a and 98b, via suitable fasteners, such as bolts 98c positioned within recesses that are slots 62c and 64c (FIG. 7) within the first and second electrodes. While slots are the recesses in this example, and the examples disclosed below, the recesses in the electrodes may be of other types to provide a suitable means of mounting the capacitor assembly. First and second electrodes 62 and 64 are separated by cylindrically shaped spacer or tube 68 that forms an enclosure between the electrodes and around wound capacitor 90. The tube has inserts 68a at its opposing ends for seating of sealing elements 66a and 66b. More generally, tube 68 can also be referred to as an enclosure of the capacitor assembly. Enclosure or tube 68 is shown with a cutout section in FIG. 7 to reveal wound capacitor 90 disposed within the tube. Material selection for the electrodes, spacers and sealing elements may be as described in the previous examples of the invention. One or more open fill ports 69a is shown in FIG. 8(b) with fill port seal fitting 69 shown seated in the fill port in FIG. 8(b). Capacitor assembly 60 may be arranged for compression fitting by applying a force in the direction of the arrows shown in FIG. 8(a) to result in the assembled sealed and impregnated wound capacitor assembly of the present invention shown in FIG. 8(c). When compression fitted, the reduced outer diameter ends of tube 68 are inserted within the extended ends of the electrodes so that the sealing elements compress against the inner walls of the electrodes. While under compression, a heating, or other process step may be performed to form a mechanical and electrical bond between the ends of wound capacitor 90 and electrodes 62 and 64. For example, if capacitor ends 90a and 90b are metal (pre-tined with solder) coated (other otherwise coated) after winding of the capacitor, the heating process step will bond each end of the capacitor and adjacent electrode together by heat flow of the coating metal.

Some examples of alternative embodiments of capacitor assembly 60 in FIG. 7, FIG. 8(a), FIG. 8(b) and FIG. 8(c) are based on alternative interfaces between cylindrical enclosure or tube 68 and the first and second electrodes. For example, capacitor assembly 70 in FIG. 9(a) and FIG. 9(b) has an outer ridge 78a on enclosure or tube 78 (with outer diameter greater than the inner diameter of the extended ends 62b and 64b of the electrodes) that may be formed from an elastomer, such as a rubber composition, so that outer ridge 78a is compression fitted against edges 62a and 64a of electrodes 62 and 64 without separate sealing elements. When compression fitted, the reduced outer diameter ends 78b of enclosure or tube 78 are inserted within the extended ends of the electrodes as shown in FIG. 9(c) to form an assembled sealed and impregnated wound capacitor assembly of the present invention.

For capacitor assembly 80 in FIG. 10(a) and FIG. 10(b), enclosure or tube 88 may be formed from an elastomer with notched ends 88a that are compression fitted into extended ends 62b and 64b of electrodes 62 and 64 without separate sealing elements as shown in FIG. 10(c) to form an assembled sealed and impregnated wound capacitor assembly of the present invention.

Figure 11C:
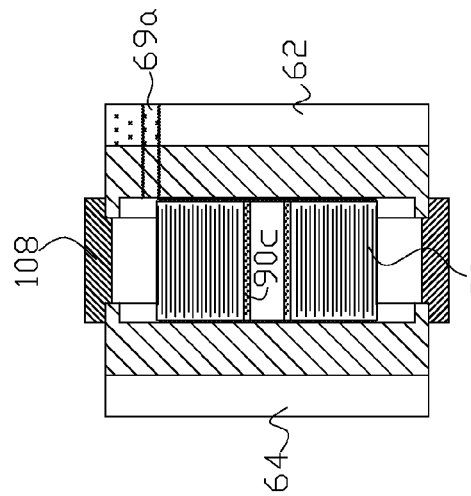
FIG. 11(c) is an assembled cross sectional elevation view of the sealed and impregnated wound capacitor assembly shown in FIG. 11(a).
Figure 11B:
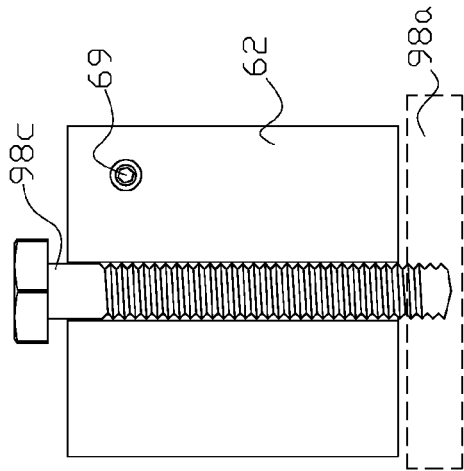
FIG. 11(b) is a side elevational view of another example of a sealed and impregnated wound capacitor assembly of the present invention with reference to one example of mounting the capacitor assembly to external electrical conductors.
Figure 11A:
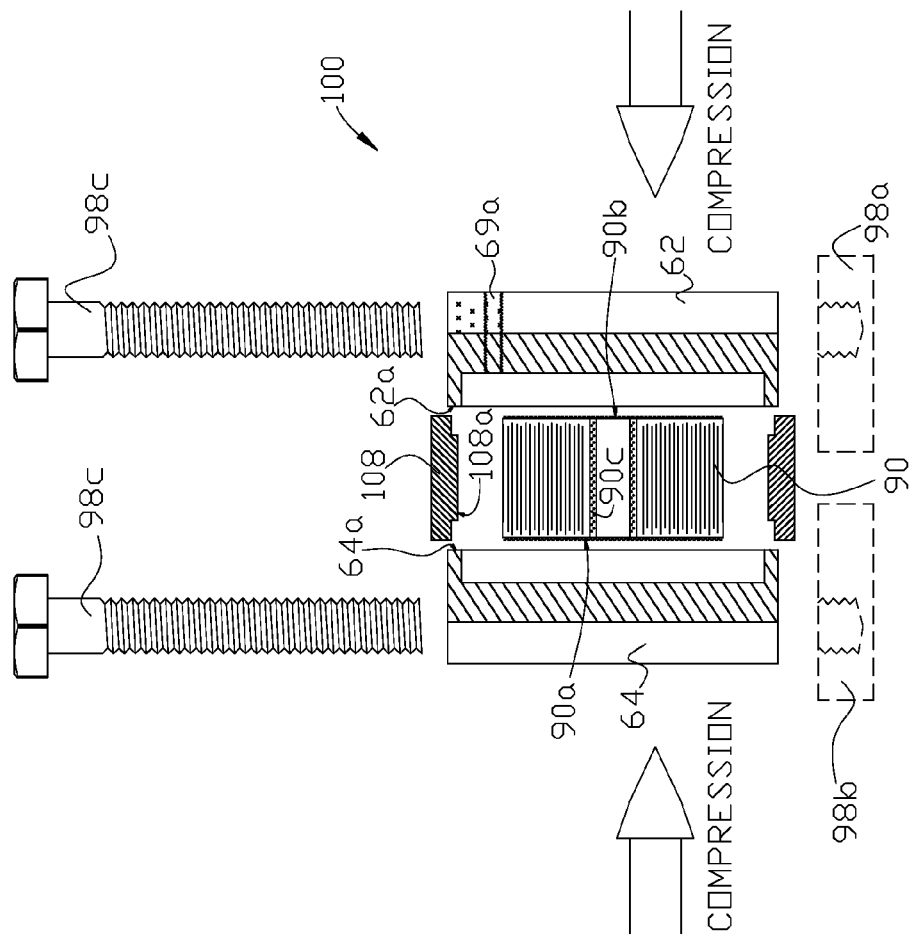
FIG. 11(a) is an exploded cross sectional elevation view.

For the capacitor assembly 100 in FIG. 11(a) and FIG. 11(b) inner ridge 108a of enclosure or tube 108 may be formed from an elastomer so that inner ridge 108a is compression fitted against edges 62a and 64a of electrodes 62 and 64 without separate sealing elements as shown in FIG. 11(c) to form an assembled sealed and impregnated wound capacitor assembly of the present invention.

Figure 12C:
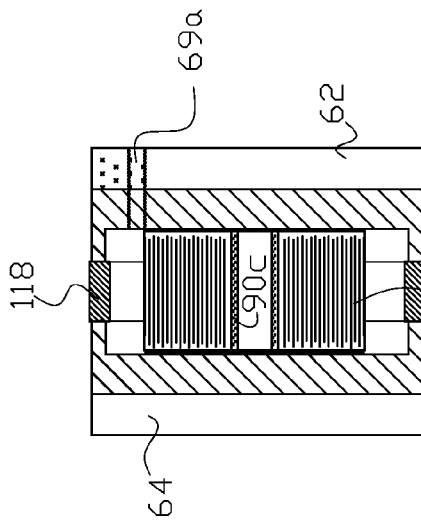
FIG. 12(c) is an assembled cross sectional elevation view of the sealed and impregnated wound capacitor assembly shown in FIG. 12(a).
Figure 12B:
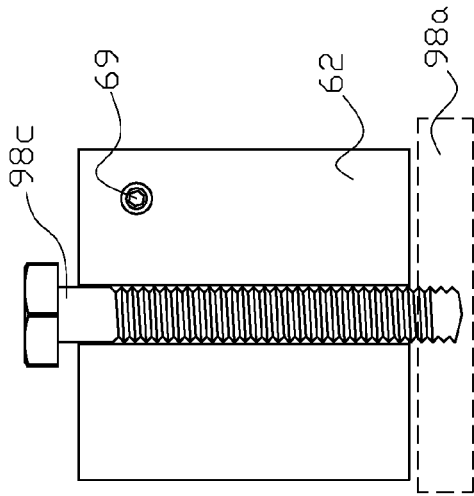
FIG. 12(a) is an exploded cross sectional elevation view and FIG. 12(b) is a side elevational view of another example of a sealed and impregnated wound capacitor assembly of the present invention with reference to one example of mounting the capacitor assembly to external electrical conductors.
Figure 12A:
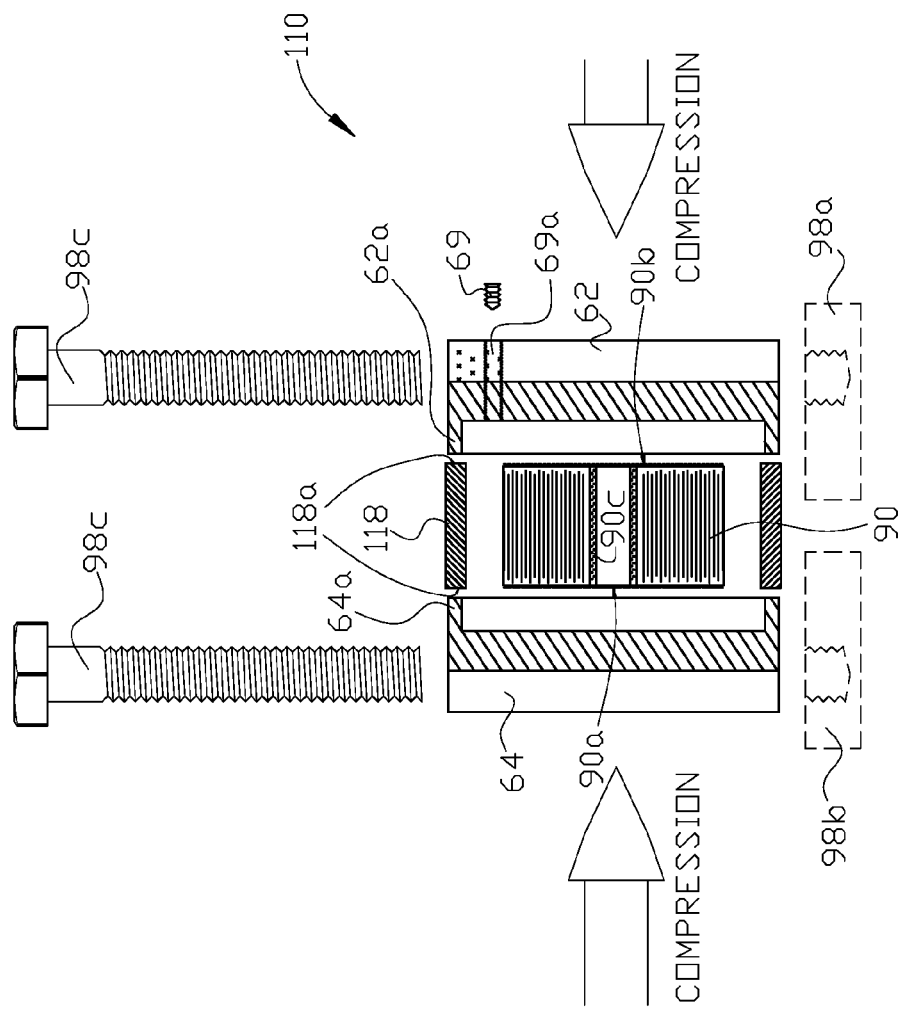

For the capacitor assembly 110 in FIG. 12(a) and FIG. 12(b) opposing edges 118a of enclosure or tube 118 are compression fitted against edges 62a and 64a of electrodes 62 and 64 without separate sealing elements as shown in FIG. 12(c) to form an assembled sealed and impregnated wound capacitor assembly of the present invention.

Figure 13B:
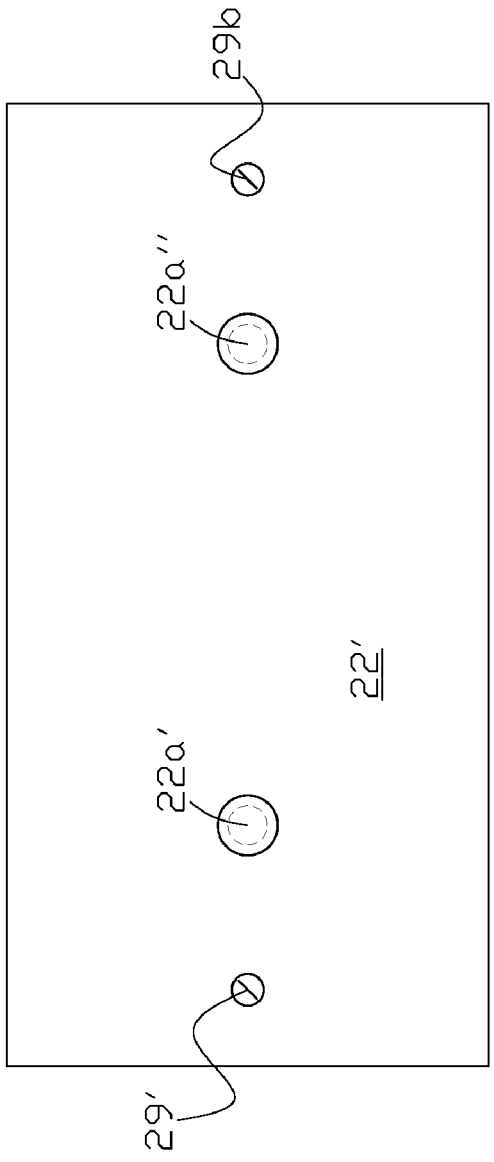
FIG. 13(b) is a top plan view of another example of a sealed and impregnated wound capacitor assembly of the present invention comprising two wound capacitors.
Figure 13A:
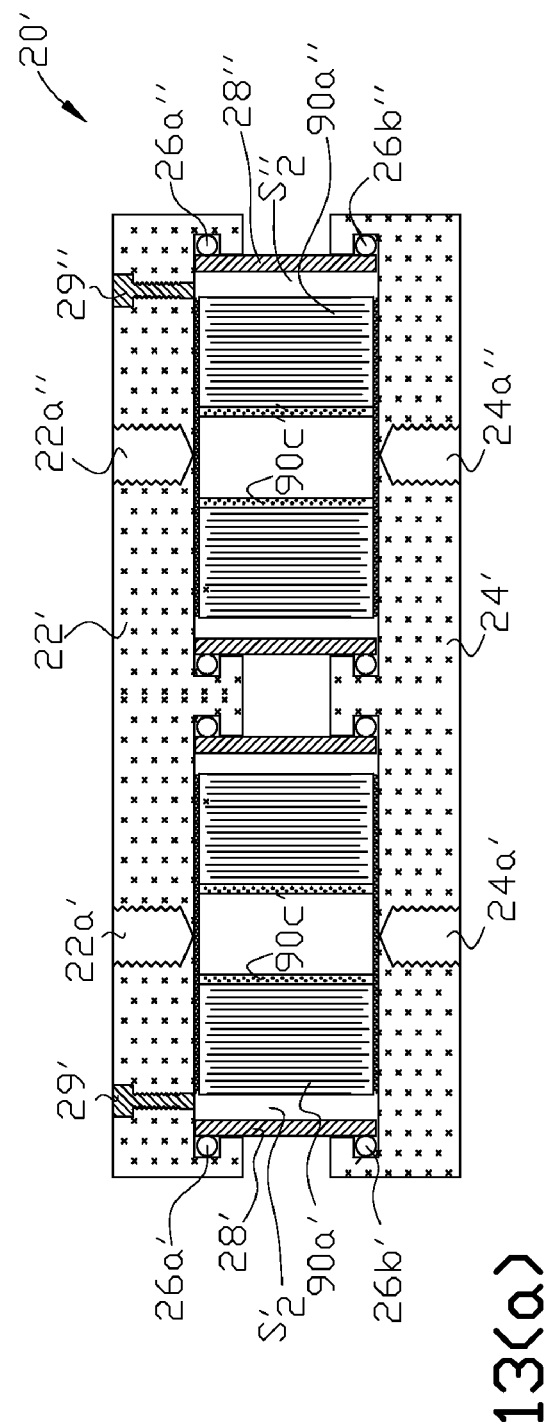
FIG. 13(a) is a cross sectional elevation view.

FIG. 13(a) and FIG. 13(b) illustrate another example of the present invention wherein sealed and impregnated wound capacitor assembly 20' comprises two wound capacitors 90a' and 90a'' that are connected in parallel between common first and second electrodes 22' and 24' with each of the wound capacitors having its own enclosed annular region, namely $S'_2$ and $S''_2$, formed from separate spacers (enclosures) or tubes 28' and 28''. The sealing arrangement between electrodes and each enclosure or tube is similar to that for capacitor assembly 20 (FIG. 3(a)) above with appropriate modifications to accommodate the dual capacitor arrangement. In alternative examples of the invention, a single enclosure can be provided around both wound capacitors 90a' and 90a'' to form a common enclosed region for the two capacitors. While two wound capacitors are shown in this example, any number of wound capacitors may be satisfactorily provided in the capacitor assembly. Further any of the other enclosures and enclosure sealing examples disclosed herein may be appropriately modified to accommodate a multiple capacitor arrangement in a sealed and impregnated wound capacitor assembly of the present invention.

To complete the process of assembling a sealed and impregnated wound capacitor assembly of the present invention, the following, or similar, process steps may be performed. A sealed and impregnated wound capacitor assembly disclosed in any of the above examples of the invention is placed (as assembled in the example except for closing the one or more fill ports) into a suitable vacuum chamber. A low pressure (vacuum), for example in the range of 100 millitorr or as otherwise required for a particular capacitor assembly of the present invention, is drawn in the chamber. A fluid dielectric, such as an oil, is introduced into the chamber (at vacuum) until the capacitor assembly is submerged in the oil. The chamber is then vented to atmosphere, which forces the oil into the capacitor assembly's enclosed region through the one or more fill ports, and then between the conductor and insulation windings of wound capacitor 90. After a period of time for thorough oil penetration into the windings of the capacitor assembly, the capacitor assembly is removed from the chamber, and the each of the one or more fill ports are sealed to complete the fabrication process. Alternative processes may also be used to impregnate the wound capacitor with fluid dielectric before sealing the one or more fill ports.

As an optional process step, during the fabrication of a wound capacitor assembly of the present invention, one or more passages may be formed in the metal (or other) coating formed over an end of the capacitor for achieving the bond with an electrode to enhance oil penetration into the windings of the capacitor during the vacuum impregnation process step.

In all examples of the invention the capacitor electrodes may be of any shape, for example, round, square or rectangular, and the method of connecting the electrodes to external electrical conductors or supporting structure can be accomplished in any manner suitable to a particular application.

For high current applications, a wound capacitor is dimensionally optimized with a small width (identified as "L" in FIG. 1) between ends, and a large diameter to maximize available contact area to the exposed metal foil/metalized film at the opposing ends of the capacitor, and to minimize the distance of the charge (current) flow path through the capacitor, which, in turn, minimizes Joule heating within the windings of the capacitor; dimensional optimization is limited by the increase in margin area as the width decreases and the diameter increases. In all examples of the invention, the typically large size of the solid electrodes that may be used, for example on the order of a 1.5 inch solid cube of copper, not only carries high current but also serves as a heat sink for Joule heating in the capacitor. If necessary for a particular application, internal through passages can be provided in the electrodes for circulation of a cooling medium such as water.

In some examples of the invention the wound capacitor utilized in a sealed and impregnated wound capacitor assembly of present invention may be a modified form of any one of the capacitors disclosed in U.S. Pat. No. 6,493,206 (entitled "Electrical Capacitor with Improved Heat Transfer Characteristics"), which is incorporated herein by reference in its entirely. A typical capacitor ("the '206 capacitor") disclosed in U.S. Pat. No. 6,493,206 is shown in FIG. 14(a) of the present application. The '206 capacitor has a first electrode layer formed from first and second metallic foils that serve as first and second metal electrodes, 70 and 72, respectively. These two electrodes have unequal cross sectional widths and are separated from each other along their adjacent longitudinal ends by the width of an open region that is referred to as a margin. Since electrodes 70 and 72 will form the anode and cathode of wound capacitor 90', the width 94 of the first margin $M_1$ between electrodes 70 and 72 must be sufficient to withstand the applied working voltage for capacitor 90. A first metalized film layer 81a is placed adjacent to the first layer of metal electrodes 70 and 72. The metalized film layer can be formed by vapor depositing an electrically conductive metalized film 83, such as aluminum, on a dielectric substrate 82. The first layer of metalized film has its dielectric substrate 82 facing the first electrode layer. A second layer of metalized film 81b is placed over the first metalized film layer 81a with its metalized film 83 adjacent to the metalized film in first metalized film 81a. A second electrode layer consists of third and fourth metallic foils which serve as third and fourth electrodes, 74 and 76, respectively. Similar to first and second electrodes 70 and 72, third and fourth 74 and 76 electrodes have unequal cross sectional widths and are separated from each other along their adjacent longitudinal ends by a margin, which is referred to as the second margin $M_2$ with a width 96. A third metalized film layer 81c is placed over the second electrode layer and oriented so that its dielectric substrate 82 is adjacent to the second electrode layer. A fourth metalized film layer 81d is placed over the third metalized film layer 81c with its metalized film 83 placed adjacent to the metalized film in the third metalized film layer 81c. In this example, the first electrode layer and composite layers 81a and 81b, in combination, comprise one example of a capacitor composite layer, and second electrode layer, and composite layers 81c and 81d, in combination, comprise another example of a capacitor composite layer as further described in U.S. Pat. No. 6,493,206 in various alternative examples and arrangements.

In some examples of the present invention a '206 capacitor with an open-space margin between electrodes in a two electrode layer is modified so that an electrical insulating material 98, such as kraft capacitor paper, fills the '206 capacitor's margin of open space as shown in cross section in FIG. 14(b) and in an electrode layer in FIG. 14(c) for wound capacitor 90'. The kraft capacitor paper maintains the spacing between the two electrodes in the electrode layer, for example, during the vacuum impregnation process step, so as to maintain low losses in a sealed and impregnated capacitor assembly of the present invention. If the electrical insulating material is not used between the two electrodes in a single electrode layer (that is, in the open-space margin of the prior art '206 capacitor, there is the possibility that the width of the open-space margin between electrodes will collapse which would result in high capacitor losses. The various '206 capacitor examples and arrangements of wound capacitors with open-space margins between electrodes in the same electrode layers may be utilized in a capacitor assembly of the present invention when the open-space margins are replaced by an electrical insulating material.

While cylindrically or tubular shaped enclosures, spacers or tubes are used in the above examples of the invention, enclosures, spacers or tubes of other shapes, for example, hexagonal, may also be used in the present invention.

While the fill ports are disclosed as being located in an electrode in the examples of the invention, in other examples of the invention the sealable fill port may be disposed in the capacitor assembly's enclosure or tube.

The present invention has been described in terms of preferred examples and embodiments. Equivalents, alternatives and modifications, aside from those expressly stated, are possible and within the scope of the invention.

The invention claimed is:
1. A sealed and impregnated wound capacitor assembly comprising:
   at least one wound capacitor;

a first and second electrodes, the first and second electrodes respectively connected to opposing ends of each of the at least one wound capacitor to form an electrical connection between each end of the at least one wound capacitor and the respective first or second electrode;

an enclosure surrounding the length of each one of the at least one wound capacitor, the enclosure forming a sealed annular region between the interior of the enclosure, the first and second electrodes and the exterior of the length of each one of the at least one wound capacitor;

a fill port disposed within at least the first or second electrode, the fill port forming a fluid dielectric flow path into the sealed annular region;

an insertable seal fitting for sealing the fluid dielectric flow path; and a fluid dielectric disposed between the conductor and insulation windings of each one of the at least one wound capacitor by vacuum impregnation of the fluid dielectric supplied to the sealed annular region via the fill port prior to sealing the fluid dielectric flow path with the insertable sealing fitting.

2. The sealed and impregnated wound capacitor assembly of claim 1 wherein the enclosure comprises a tubular enclosure, the tubular enclosure having an extend end at each opposing end of the tubular enclosure, the extend end at each opposing end of the tubular enclosure extending respectively over a region of the first and second electrodes, the capacitor assembly further comprising a sealing element disposed between the extended end at each end of the tubular enclosure and the adjacent respective region of the first and second electrodes.

3. The sealed and impregnated wound capacitor assembly of claim 1 wherein the enclosure comprises a tubular enclosure, an extended region of the first and second electrodes extending respectively over an end region of the tubular enclosure at each opposing end of the tubular enclosure, the capacitor assembly further comprising a sealing element disposed between the extended region of the first and second electrodes and the adjacent respective end region of the tubular enclosure.

4. The sealed and impregnated wound capacitor assembly of claim 3 wherein the sealing element is vertically aligned and in contact with an opposing end of the tubular enclosure.

5. The sealed and impregnated wound capacitor assembly of claim 1 wherein the enclosure comprises a tubular enclosure, the tubular enclosure having an extended end region at each opposing end of the tubular enclosure, the extended end region at each opposing end of the tubular enclosure respectively extending over a peripheral region of the first and second electrodes, the interior of each extended end region of the tubular enclosure having a metalized or metal plated surface bonded to the respective adjacent peripheral regions of the first and second electrodes.

6. The sealed and impregnated wound capacitor assembly of claim 1 further comprising a first and second electrical contact plate respectively interposed between the first and second electrodes and the adjacent ends of the at least one wound capacitor, the first and second electrical contact plate electrically connected to the respective first and second electrode and the adjacent ends of the at least one wound capacitor, the first and second electrical contact plates extending beyond the peripheral regions of the first and second electrodes, the enclosure comprising a tubular enclosure, the tubular enclosure having an extended end region at each opposing end of the tubular enclosure, the extend end region at each opposing end of the tubular enclosure respectively extending over a peripheral region of the first and second electrical contact plates, the interior of each extended end region of the tubular enclosure having a metalized or metal plated surface bonded to the respective adjacent peripheral regions of the first and second electrical contact plates.

7. The sealed and impregnated wound capacitor assembly of claim 1 wherein the enclosure comprises a tubular enclosure, each end of the tubular enclosure having a reduced outer diameter region, a recess disposed in the outer wall of each of the reduced outer diameter regions, a sealing element disposed in each of the recesses, a region of the first and second electrodes extending respectively over the reduced outer diameter region at the opposing ends of the tubular enclosure.

8. The sealed and impregnated wound capacitor assembly of claim 1 wherein the enclosure comprises a tubular enclosure formed from an elastomer, each end of the tubular enclosure having a reduced outer diameter region, a region of the first and second electrodes extending respectively over the reduced outer diameter region at the opposing ends of the tubular enclosure, the regions of the first and second electrodes forming a compression fit with the tubular enclosure.

9. The sealed and impregnated wound capacitor assembly of claim 1 wherein the enclosure comprises a tubular enclosure formed from an elastomer, each end of the tubular enclosure having a notched end, a region of the first and second electrodes inserted into each of the notched ends of the tubular enclosure to form a compression fit with the tubular enclosure.

10. The sealed and impregnated wound capacitor assembly of claim 1 wherein the enclosure comprises a tubular enclosure formed from an elastomer, each end of the tubular enclosure having a reduced inner diameter region, a peripheral region of the first and second electrodes extending respectively into the reduced inner diameter region at the opposing ends of the tubular enclosure, the regions of the first and second electrodes forming a compression fit with the tubular enclosure.

11. The sealed and impregnated wound capacitor assembly of claim 1 wherein the enclosure comprises a tubular enclosure formed from an elastomer, a peripheral edge region of the first and second electrodes compression fitted against edges of the tubular enclosure at opposing ends of the tubular enclosure.

12. The sealed and impregnated wound capacitor assembly of claim 1 further comprising a recess in each of the first and second electrodes for connecting the capacitor assembly between two electrical bus bars.

13. The sealed and impregnated wound capacitor assembly of claim 12 wherein the recess comprises a threaded hole for attaching the capacitor assembly to the pair of electrical bus bars when the two electrical bus bars are vertically oriented with each other.

14. The sealed and impregnated wound capacitor assembly of claim 12 wherein the recess comprises a notch for attaching the capacitor assembly to the two electrical bus bars when the two electrical bus bars are horizontally oriented to each other.

15. The sealed and impregnated wound capacitor assembly of claim 1 wherein the at least one wound capacitor comprises at least two adjacent capacitor composite layers, each capacitor composite layer having at least one electrode layer, the at least one electrode layer further comprising two metal electrodes separated by a strip of electrical insulating material, the strip of electrical insulating material in the at least one electrode layer of one of the at least two adjacent capacitor composite layers being offset from the strip of electrical insulating material in the at least one electrode layer of the other of the at least two adjacent composite layers.

16. A method of forming a sealed and impregnated wound capacitor assembly, the method comprising the steps of:

connecting a first and second electrodes to the opposing ends of a wound capacitor to form an electrical connection between each end of the wound capacitor and the respective first or second electrode;

forming a pre-impregnated capacitor assembly by surrounding the length of the wound capacitor with an enclosure forming a sealed annular region between the interior of the enclosure, the first and second electrodes and the exterior of the length of each one of the at least one capacitor, at least the first or second electrode having a fill port forming a fluid dielectric flow path into the sealed annular region;

placing the pre-impregnated capacitor assembly in a vacuum chamber;

evacuating the vacuum chamber;

submerging the pre-impregnated capacitor assembly in a fluid dielectric in the evacuated vacuum chamber;

venting the vacuum chamber; and sealing the fill port with a seal fitting.

17. The method of claim 16 further comprising the step of forming one or more passages in a bonding material used to connect the first and second electrodes to the opposing ends of the wound capacitor prior to the step of connecting the first and second electrodes to the opposing ends of the wound capacitor.

* * * * *